(12) United States Patent
Murata et al.

(10) Patent No.: US 11,039,414 B2
(45) Date of Patent: Jun. 15, 2021

(54) FINGERPRINT DATA PRE-PROCESS METHOD FOR IMPROVING LOCALIZATION MODEL

(71) Applicant: INTERNATIONAL BUSINESS MACHINES CORPORATION, Armonk, NY (US)

(72) Inventors: Masayuki Murata, Tokyo (JP); Daisuke Sato, Chiba-ken (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/819,322

(22) Filed: Nov. 21, 2017

(65) Prior Publication Data
US 2019/0159159 A1  May 23, 2019

(51) Int. Cl.
*H04W 64/00* (2009.01)
*G01S 5/02* (2010.01)

(52) U.S. Cl.
CPC ............ *H04W 64/00* (2013.01); *G01S 5/021* (2013.01); *G01S 5/0252* (2013.01)

(58) Field of Classification Search
CPC ..... H04W 64/00; H04W 64/006; G01S 5/021; G01S 5/0252
See application file for complete search history.

(56) References Cited

U.S. PATENT DOCUMENTS

| | | | | | |
|---|---|---|---|---|---|
| 2003/0216143 | A1* | 11/2003 | Roese | ........................ | G01S 5/02 455/456.1 |
| 2008/0112346 | A1* | 5/2008 | Tolpin | ............... | H04W 52/0229 370/311 |
| 2010/0097946 | A1* | 4/2010 | Celentano | ............. | H04W 48/16 370/252 |
| 2014/0274022 | A1* | 9/2014 | Bell | ........................ | G06F 16/21 455/418 |
| 2014/0370909 | A1* | 12/2014 | Natucci, Jr. | ........ | H04W 52/0225 455/456.1 |
| 2015/0172872 | A1* | 6/2015 | Alsehly | .................... | H04W 4/33 455/457 |
| 2016/0202341 | A1 | 7/2016 | Burgess et al. | | |

(Continued)

FOREIGN PATENT DOCUMENTS

| | | |
|---|---|---|
| CN | 101187703 A | 5/2008 |
| CN | 104276462 A | 1/2015 |
| CN | 106412839 A | 2/2017 |

OTHER PUBLICATIONS

International Search Report Issued in PCT/IB2018/059031 dated Mar. 13, 2019, 9 pages.

(Continued)

*Primary Examiner* — Dinh Nguyen
(74) *Attorney, Agent, or Firm* — Tutunjian & Bitetto, P.C.; Randall Bluestone

(57) ABSTRACT

Provided is a computer-implemented method including acquiring a first pieces of observation data that include a position of a mobile object and a received signal strength of a wireless signal observed by the mobile object; and correcting each position of the mobile object included in each piece of observation data of the first pieces of observation data using one position of the mobile object at a time before the received signal strength included in the piece of observation data is observed.

12 Claims, 9 Drawing Sheets

(56) References Cited

U.S. PATENT DOCUMENTS

2016/0371394 A1 12/2016 Shahidi et al.
2018/0180706 A1* 6/2018 Li ......................... H04W 4/029

OTHER PUBLICATIONS

Fink, J. et al., "Online Methods for Radio Signal Mapping with Mobile Robots" 2010 IEEE International Conference on Robotics and Automation (May 2010) pp. 1940-1945.

Jung, S.H. et al., "Performance Evaluation of Radio Map Construction Methods for Wi-Fi Positioning Systems" IEEE Transactions on Intelligent Transportation Systems (Aug. 2016) pp. 880-889.

Li, Q. et al., "Fingerprint and Assistant Nodes Based Wi-Fi Localization in Complex Indoor Environment" IEEE Access (Jun. 2016) pp. 2993-3004, vol. 4.

Guo, X. et al., "Indoor Localization by Fusing a Group of Fingerprints Based on Random Forests" arXiv:1703.02185 (Dec. 2016) pp. 1-29.

"Equidistributed sequence" Wikipedia, last edited on Aug. 4, 2017, pp. 1-7.

* cited by examiner

FINGERPRINT DATA PRE-PROCESS METHOD FOR IMPROVING LOCALIZATION MODEL

BACKGROUND

Technical Field

The present invention relates to generation of a received signal strength (RSS) distribution.

Related Art

Conventionally, when building a fingerprint-style positioning system, fingerprints that indicate a correspondence relationship between a position of an apparatus that receives a wireless signal and a received signal strength (RSS) are collected in advance at a plurality of positions. Concerning such collecting, documents of prior art disclose that "the fingerprint samples are collected while the surveyors are walking along the paths carrying collection devices." However, with such a technique, time lag can occur between the change in position and the change in the RSS. Furthermore, the observation position of the RSS can become localized on the movement path.

SUMMARY

According to one aspect of the present invention, provided is a computer-implemented method comprising acquiring a first plurality of pieces of observation data that each include a position of a mobile object and a received signal strength of a wireless signal observed by the mobile object; and correcting each position of the mobile object included in each piece of observation data of the first plurality of pieces of observation data using at least one position of the mobile object at time before the received signal strength included in the piece of observation data is observed. In this way, it is possible to increase the accuracy of the estimation of the position from the received signal strength.

The correcting may include correcting the position of the mobile object included in each piece of observation data of the first plurality of pieces of observation data, using the position of the mobile object observing the received signal strength within a time window having a predetermined time span and corresponding to a timing of observation of the received signal strength included in the piece of observation data. In this case, it is possible to increase the accuracy of the estimation of the position from the received signal strength.

The time window for each of the first plurality of pieces of observation data may have the predetermined time span with a start point that is a predetermined time earlier than an observation timing of the piece of observation data. In this case, if the change of the received signal strength is temporally delayed relative to the change of the position of the mobile object, it is possible to reliably reduce this delay.

The computer-implemented method may further comprise sending a request to move the mobile object relative to a transmission apparatus that transmits the wireless signal, during a process of setting the time window; and setting the time window based on a delay amount of a change of the received signal strength of the wireless signal that accompanies the movement. In this case, if the change of the received signal strength is temporally delayed relative to the change of the position of the mobile object, it is possible to reliably reduce this delay.

The computer-implemented method may further comprise generating a received signal strength distribution in which a distribution of positions included in the first plurality of pieces of observation data has been made uniform, by extracting each piece of observation data corresponding to some positions from the first plurality of pieces of observation data for which the position of the mobile object has been corrected. In this case, it is possible to increase the accuracy of the estimation of the position from the received signal strength.

According to another aspect of the present invention, provided is a computer-implemented method comprising acquiring a received signal strength distribution that includes a received signal strength of a wireless signal at each of a plurality of positions; and generating a received signal strength distribution in which a distribution of the plurality of positions included in the received signal strength distribution have been made uniform, by extracting each received signal strength corresponding to some of the positions among the plurality of positions from the received signal strength distribution. In this way, it is possible to increase the accuracy of the estimation of the position from the received signal strength.

The computer-implemented method may further comprise generating a model for estimating a position from a received signal strength, using the received signal strength distribution in which the distribution of the plurality of positions has been made uniform. In this case, it is possible to generate a high-accuracy positioning model.

The computer-implemented method may further comprise generating a probability density distribution indicating the distribution of the plurality of positions, and the extracting may include performing resampling of each of the plurality of positions according to a probability that has an inverse correlation relationship with a probability resulting from the probability density distribution. In this case, it is possible to generate an RSS distribution in which the distribution of observation positions has been made uniform.

According to another aspect of the present invention, provided is a computer program product for performing the computer-implemented method.

According to still another aspect of the present invention, provided is an apparatus for performing the computer-implemented method.

The summary clause does not necessarily describe all necessary features of the embodiments of the present invention. The present invention may also be a sub-combination of the features described above.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

(1. Apparatus)

Figure 1:
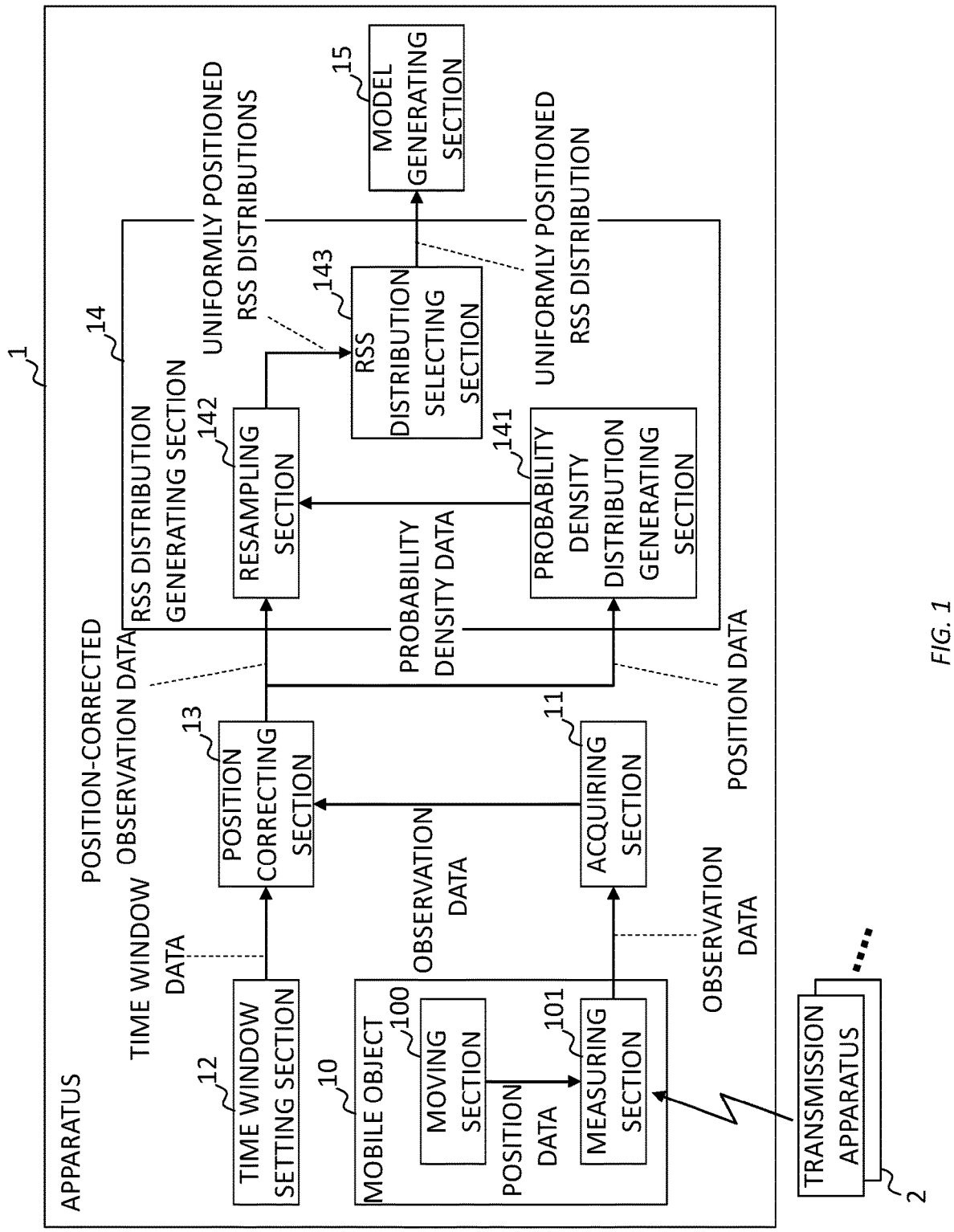
FIG. 1 shows an apparatus according to an embodiment of the present invention.

FIG. 1 shows an apparatus 1 according to an embodiment of the present invention, along with a transmission apparatus 2. The apparatus 1 generates a received signal strength (RSS) distribution of a wireless signal emitted from one or more of the transmission apparatuses 2 and, as an example, further generates a positioning model for estimating the position from the RSS. The apparatus 1 includes a mobile object 10, an acquiring section 11, a time window setting section 12, a position correcting section 13, an RSS distribution generating section 14, and a model generating section 15. Among the sections of the apparatus 1, the portions other than the mobile object 10 or the portions other than the moving section 100, described below, in the mobile object 10 may form a portable information processing apparatus such as a handheld PC or smartphone.

Here, the RSS distribution may be an association between a plurality of positions and the RSS of one or more wireless signals received at each position, and is used for fingerprint positioning. The RSS distribution may cover the entire area of an indoor environment where GPS cannot be used. The wireless signal may be a beacon for establishing wireless communication between one or more handheld information processing apparatuses existing in the indoor environment and wireless LAN (e.g. Wi-FI) and/or BLE (Bluetooth (Registered Trademark) Low Energy). As an example, the wireless signal may be emitted at intervals of 100 ms. The transmission apparatus 2 may be secured in the indoor environment, and may be housed in a wireless LAN access point, for example.

(1-1. Mobile Object)

The mobile object 10 can move relative to the transmission apparatus 2. As an embodiment of the present invention, the mobile object 10 is housed in the apparatus 1 and moves integrally with the apparatus 1. However, the mobile object 10 does not need to be equipped in the apparatus 1, and may be formed separately from the apparatus 1 to move independently from the apparatus 1, for example. The mobile object 10 includes a moving section 100 and a measuring section 101.

(1-1-1. Moving Section)

The moving section 100 causes the mobile object 10 to move relative to the transmission apparatus 2. For example, the moving section 100 may include a plurality of wheels. The moving section 100 may include a power source, but does not need to include a power source. The moving section 100 may cause the mobile object 10 to move in response to a request from a requesting section (not shown) of the apparatus 1. The moving section 100 may be run on its own, or may move according to the manipulation of an operator. The path of the movement caused by the moving section 100 does not need to pass through all of the positions equally in the indoor environment. As an embodiment of the present invention, the moving section 100 supplies the acquiring section 11 with the position of the mobile object 10 in the indoor environment. It should be noted that the position of the mobile object 10 may be input to the acquiring section 11 by the operator.

(1-1-2. Measuring Section)

The measuring section 101 measures the RSS of each wireless signal emitted from the one or more transmission apparatuses 2. The measuring section 101 may generate one piece of observation data in which each measured RSS is associated with an observation time and a position of the mobile object 10 measuring the RSS at this observation time (also referred to as the observation position). The measuring section 101 may generate the observation data periodically, e.g. every 1 s. The collection of such observation data may form the RSS distribution that includes the RSS of the wireless signal at each of the plurality of positions. The measuring section 101 may supply the acquiring section 11 with the measured observation data.

In the present embodiment, the measuring section 101 may perform a measurement during the movement of the mobile object 10. Therefore, the measurement position obtained by the measuring section 101 may have a non-uniform distribution in the indoor environment. Furthermore, time is needed for the mobile object 10 to receive the wireless signal. The measuring section 101 may perform a time-series filtering process on the plurality of RSSs measured in series, to output a smoothed RSS value as the measurement value. Therefore, the change in the measurement value of the RSS in the observation data may occur later than the change in the measurement position.

(1-2. Acquiring Section)

The acquiring section 11 acquires a plurality of pieces of observation data. As an embodiment of the present invention, the acquiring section 11 acquires the observation data from the measuring section 101, but may instead generate the observation data by measuring the RSS itself. The acquiring section 11 may supply the position correcting section 13 with the acquired observation data.

(1-3. Time Window Setting Section)

The time window setting section 12 sets a time window based on the delay amount of the change in the RSS that accompanies the movement of the mobile object 10. Here, the time window is used to correct the position included in the observation data, and may be set for the observation timing of each piece of observation data. The time window setting section 12 may supply the position correcting section 13 with data concerning the set time window. This time window data may indicate the time span, start time, and/or end time of the time window.

(1-4. Position Correcting Section)

The position correcting section 13 corrects each position of the mobile object 10 included in each piece of observation data of the plurality of pieces of observation data using at least one position of the mobile object 10 at time before the RSS included in the piece of observation data is observed. For example, the position correcting section 13 may correct the observation position included in each piece of observation data of the plurality of pieces of observation data, using the observation position within the time window set by the time window setting section 12. In this way, the time lag between the change in the observation position and the change in the RSS may be reduced. The observation position within the time window may be the position where the mobile object 10 is present within the time window. The position correcting section 13 may supply the RSS distribution generating section 14 with the observation data after the position correction has been performed.

(1-5. RSS Distribution Generating Section)

The RSS distribution generating section 14 generates an RSS distribution in which the distribution of positions included in the pieces of observation data is more uniform. The RSS distribution generating section 14 includes a probability density distribution generating section 141, a resampling section 142, and an RSS distribution selecting section 143.

(1-5-1. Probability Density Distribution Generating Section)

The probability density distribution generating section 141 generates a probability density distribution indicating the distribution of the positions of the mobile object 10 at the timings when the pieces of observation data were acquired. As an example in the present embodiment, the probability density distribution generating section 141 acquires the position data after the correction is performed from the position correcting section 13 to generate the probability density distribution, but may instead acquire the position data from the acquiring section 11. The probability density distribution generating section 141 may supply the resampling section 142 with the generated probability density distribution.

(1-5-2. Resampling Section)

The resampling section 142 extracts each piece of observation data corresponding to some of the positions from the plurality of pieces of observation data, i.e. the resampling section 142 resamples the plurality of pieces of observation data. In this way, the RSS distribution is generated in which the distribution of positions included in the pieces of observation data is more uniform. The resampling section 142 may perform the resampling using a plurality of extraction ratios. The resampling section 142 may supply the RSS distribution selecting section 143 with the RSS distribution indicated by the plurality of pieces of observation data that have been resampled, for each extraction ratio.

(1-5-3. RSS Distribution Selecting Section)

The RSS distribution selecting section 143 selects the RSS distribution with the smallest index value indicating the non-uniformity, from among the plurality of RSS distributions obtained using different extraction ratios. The RSS distribution selecting section 143 may supply the selected RSS distribution to the model generating section 15. The RSS distribution selecting section 143 does not need to be equipped in the RSS distribution generating section 14. In this case, the resampling section 142 may supply the model generating section 15 with the RSS distribution acquired by resampling with one extraction ratio.

(1-6. Model Generating Section)

The model generating section 15 generates the positioning model using the RSS distribution supplied from the RSS distribution generating section 14. The positioning model is a model for estimating the position from the RSS. For example, the positioning model may be stored in a database (not shown in the drawings) and, if a portable information processing apparatus capable of communicating with the transmission apparatus 2 is present in the indoor environment, may be used to estimate the position of this information processing apparatus.

With the apparatus 1 described above, each position of the mobile object 10 included in each piece of observation data is corrected using at least one position of the mobile object 10 at time before the RSS included in the piece of observation data is observed. For example, the observation position for each piece of observation data including the observation position and the RSS is corrected using the observation position within the time window. Accordingly, if there is a time lag between the change of the RSS and the change of the observation position caused by the observation data being acquired while the mobile object 10 is moving, it is possible to reduce the effect of this time lag such that the observation position and the RSS are correctly associated with each other. Accordingly, it is possible to increase the accuracy of the position estimation from the RSS.

Furthermore, the RSS distribution is generated with the distribution of positions included in the plurality of pieces of observation data being made more uniform. Accordingly, if the observation positions are localized on the movement path of the mobile object 10 due to the observation data being acquired while the mobile object 10 is moving, it is possible to prevent over-fitting. Therefore, it is possible to significantly increase the accuracy of the position estimation from the RSS.

Furthermore, the RSS distribution with the minimum index value indicating the non-uniformity is selected from among the plurality of RSS distributions obtained using different extraction ratios, and therefore it is possible to significantly increase the accuracy of the position estimation from the RSS.

(2. Time Window Setting Section)

Figure 2:
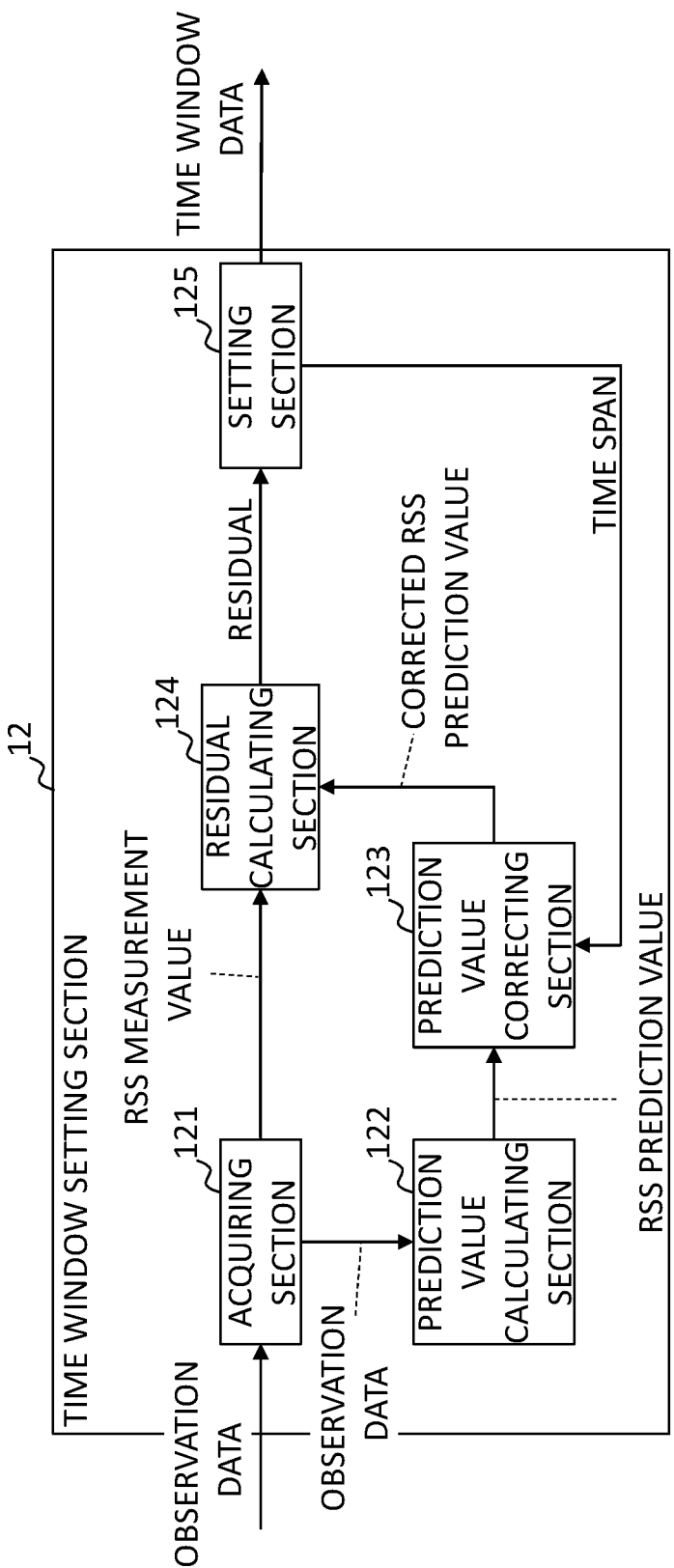
FIG. 2 shows the time window setting section, according to according to an embodiment of the present invention.

FIG. 2 shows the time window setting section 12. As an embodiment of the present invention, the time window setting section 12 sets the time window based on the delay amount of the change of the RSS that accompanies the movement of the mobile object 10 relative to the transmission apparatus 2. The time window setting section 12 includes an acquiring section 121, a prediction value calculating section 122, a prediction value correcting section 123, a residual calculating section 124, and a setting section 125.

(2-1. Acquiring Section)

The acquiring section 121 acquires the plurality of pieces of observation data. As an embodiment of the present invention, the acquiring section 121 acquires the observation data from the measuring section 101, but may instead generate the observation data by measuring the RSS itself. The acquiring section 121 may supply the acquired observation data to the prediction value calculating section 122 and the residual calculating section 124.

(2-2. Prediction Value Calculating Section)

The prediction value calculating section 122 calculates a prediction value of the RSS for each of the plurality of pieces of observation data, using the distance between the transmission apparatus 2 and the observation position included in each of the plurality of pieces of observation data acquired by the acquiring section 121. The prediction value calculating section 122 may supply the RSS prediction value to the prediction value correcting section 123.

(2-3. Prediction Value Correcting Section)

The prediction value correcting section 123 corrects the RSS prediction value using the RSS prediction value within a tentative time window having a tentative time span that is an evaluation target. The RSS prediction values within the tentative time window may be the RSS prediction value calculated for each piece of observation data within the tentative time window. The tentative time span may be sequentially changed by the setting section 125, and the prediction value correcting section 123 may calculate a corrected RSS prediction value for each tentative time span. The prediction value correcting section 123 may supply the corrected RSS prediction value to the residual calculating section 124.

(2-4. Residual Calculating Section)

The residual calculating section 124 calculates the residual between the RSS measurement value included in each of the plurality of pieces of observation data and the corrected RSS prediction value. The residual calculating section 124 may calculate the average value of the plurality of residuals for the plurality of pieces of observation data. The residual calculating section 124 may calculate the residual for each of the plurality of tentative time spans. The residual calculating section 124 may supply the setting section 125 with the residual for each of the plurality of tentative time spans.

(2-5. Setting Section)

The setting section 125 sets a tentative time span occurring when the residual calculated by the residual calculating section 124 is at a minimum as the time span of the time window for each piece of observation data.

With the time window setting section 12 described above, the time window is set based on the delay amount of the RSS change in a case where the mobile object 10 moves relative to the transmission apparatus 2. Furthermore, the time span of the time window is set in a manner to minimize the residual between the RSS measurement value and the RSS prediction value corrected for each tentative time span. Accordingly, if the RSS change is temporally delayed relative to the change of the observation position, this delay can be reliably reduced.

(3. Method)

Figure 3:
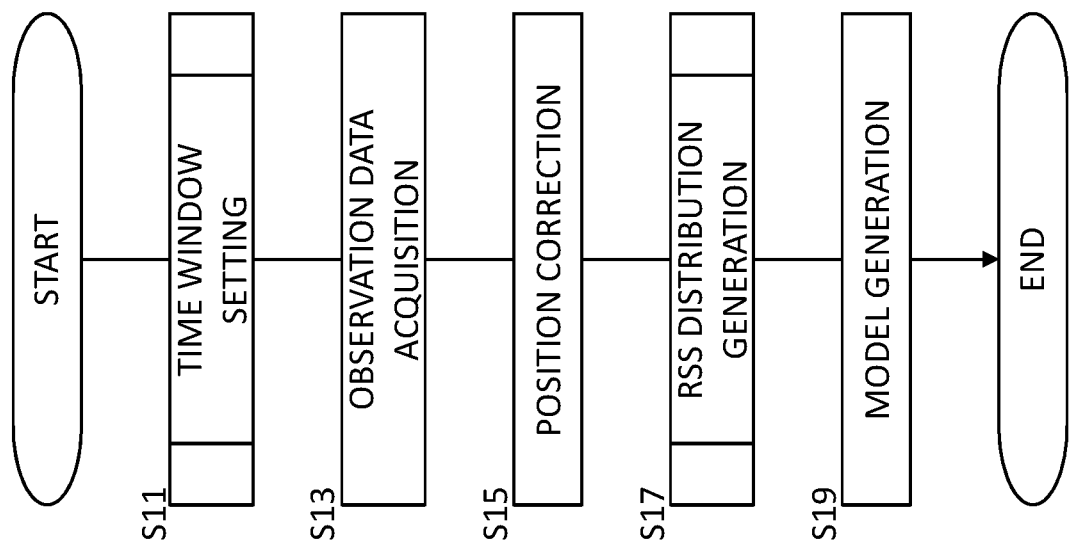
FIG. 3 shows a method according to an embodiment of the present invention.

FIG. 3 shows a method according to an embodiment of the present embodiment. The apparatus 1 generates the RSS distribution and the positioning model by performing the process of steps S11 to S19.

First, at step S11, the time window setting section 12 sets the time window. The time window setting section 12 may set the time window based on the delay amount of the RSS change that accompanies movement of the mobile object 10.

Next, at step S13, the acquiring section 11 acquires the plurality of pieces of observation data. At this time, the moving section 100 may cause the mobile object 10 to move relative to the transmission apparatus 2. In this way, the acquiring section 11 may acquire the observation data measured while the mobile object 10 is moving. The movement speed of the mobile object 10 may be set arbitrarily, according to trial and error. The pieces of observation data acquired at step S13 are one example of a first plurality of pieces of observation data, and are used to generate the RSS distribution and the positioning model.

Next, at step S15, the position correcting section 13 corrects the observation position included in each of the plurality of pieces of observation data, using the observation position within the time window. In this way, each position of the mobile object 10 included in each piece of observation data is corrected using at least one position of the mobile object 10 at time before the RSS included in the piece of observation data is observed. The observation position within the time window may be a position input separately from the observation data by a user, or may be an observation position included in at least one piece of observation data observed at an observation timing within the time window. As an example, the position correcting section 13 may correct the observation positions included respectively in the plurality of pieces of observation data to be the average of the observation positions included in at least one piece of observation data measured at the observation timing within the time window, among the plurality of pieces of observation data. The average of the positions may be the average of the position coordinates. The position correcting section 13 may set a weighted average of the plurality of observation positions included in the observation data within the time window as the corrected observation position. The weight may be made larger or smaller for newer observation data.

Next, at step S17, the RSS distribution generating section 14 generates the RSS distribution in which the distribution of the plurality of observation positions included in the plurality of pieces of observation data is made more uniform. For example, the RSS distribution generating section 14 may make the RSS distribution more uniform by extracting each piece of observation data corresponding to a portion of the observation positions from the plurality of pieces of observation data for which the observation position has been corrected by the position correcting section 13.

At step S19, the model generating section 15 generates the positioning model using the RSS distribution in which the observation positions have been made uniform. For example, the model generating section 15 may generate the positioning model through machine learning. The model generating section 15 may generate the positioning model through nonparametric regression (e.g. kernelized ridge regression, kernel regression and Gaussian process regression), for example.

With the method described above, the observation positions in the observation data are corrected using the observation position included in the observation data observed within the time window. Accordingly, it is possible to reduce the required time and effort compared to a case where the observation positions in the time window are acquired separately from the observation data and used for the correction.

Furthermore, the observation position in each piece of observation data is corrected to be the average of the observation positions included in the observation data within the time window. Accordingly, if there is a time lag between the change of the observation position and the change of the RSS, it is possible to reliably reduce the effect of this time lag.

(3-1. Time Window Setting)

Figure 4:
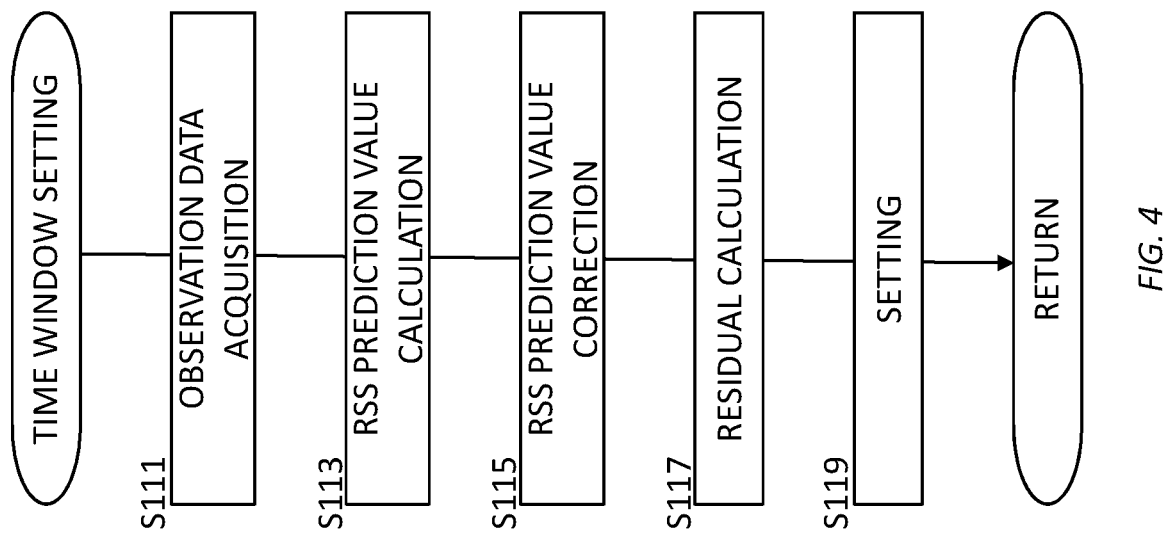
FIG. 4 shows setting of a time window, according to an embodiment of the present invention.

FIG. 4 shows the setting of the time window in step S11. The time window setting section 12 sets the time window by performing the process of steps S111 to S119.

First, a step S111, the acquiring section 121 acquires a plurality of pieces of observation data. At this time, the moving section 100 may cause the mobile object 10 to move relative to the transmission apparatus 2. In this way, the acquiring section 11 may acquire the observation data measured during the movement of the mobile object 10. The moving section 100 may cause the mobile object 10 to move such that objects obstructing with the wireless signal (e.g. walls) do not come between the mobile object 10 and the transmission apparatus 2. As an example, the moving section 100 may move the mobile object 10 only in a region near the transmission apparatus 2. The moving section 100 may instead cause the moving object 10 to move independently of positions of the objects. In this case, the acquiring section 121 may acquire a plurality of pieces of observation data observed during the objects do not come between the mobile object 10 and the transmission apparatus 2, if positions of the objects are preset in the acquiring section 121. The movement speed of the mobile object 10 may be set arbitrarily, according to trial and error. The plurality of pieces of observation data acquired in step S111 are an example of a second plurality of pieces of observation data, and are used to set the time window.

Next, at step S113, the prediction value calculating section 122 calculates the RSS prediction value of the wireless signal for each of the plurality of pieces of observation data, using the distance between the transmission apparatus 2 and the observation position included in each of the plurality of pieces of observation data acquired by the acquiring section 121.

For example, the prediction value calculating section 122 may calculate the RSS prediction value for each piece of observation data by inputting the distance between the observation position and the transmission apparatus 2 into a log-distance path loss model. The distance between the observation position included in the observation data and the transmission apparatus 2 may be known in advance. For example, the distance between the observation position and the transmission apparatus 2 may be input by the operator for each piece of observation data.

As a more specific example, it is assumed that pieces of observation data d1, d2, d3, etc. that respectively include pairs of observation positions x1, x2, x3, etc. and RSS observation values yo1, yo2, yo3, etc. are acquired at the observation timings t1, t2, t3, etc. In this case, the prediction value calculating section 122 may calculate, from the log-distance path loss model, RSS prediction values ye1, ye2, ye3, etc. corresponding to the positions x1, x2, x3, etc. of the pieces of observation data d1, d2, d3, etc. separately from the RSS measurement values yo1, yo2, yo3, etc.

Next, at step S115, the prediction value correcting section 123 corrects the RSS prediction values using the RSS prediction values within the tentative time window having the tentative time span that is the evaluation target. For example, for each piece of observation data, the prediction value correcting section 123 sets a tentative time window having a tentative time span. The start point of the tentative time window may be a predetermined time before the observation timing. For each piece of observation data, the prediction value correcting section 123 calculates the average value of one or more RSS prediction values for each piece of observation data observed within the tentative time window set for this piece of observation data, and sets this average value as the corrected RSS prediction value.

For example, in the example described above, if the time window having the tentative time span is set to include observation timings that are respectively one timing earlier and two timings earlier, the prediction value correcting section 123 may correct the RSS prediction value ye3 for the observation data d3 to be a prediction value ye3' that is calculated as (ye1+ye2+ye3)/3.

Next, at step S117, the residual calculating section 124 calculates the residual between the corrected RSS prediction value and the RSS measurement value included in each of the plurality of pieces of observation data, for each of the plurality of tentative time spans. For example, in the above example, the residual calculating section 124 may calculate the residual between the RSS measurement value yo3 and the corrected RSS prediction value ye3' for the observation data d3. The residual calculating section 124 may calculate the residual in a similar manner for each piece of observation data, and calculate the average value of the plurality of residuals.

At step S119, the setting section 125 sets the tentative time span occurring when the one or more residuals calculated by the residual calculating section 124 are at a minimum, as the time span of the time window. Furthermore, the setting section 125 may set the start point of the time window for each piece of observation data to be a predetermined time before the observation timing. Length of the predetermined time may be equal to the time span set by the setting section 125. Therefore, the setting section 125 may set the end point of the time window for each piece of observation data to be the observation timing of each piece of observation data.

With the time window setting described above, the mobile object 10 moves in a manner to prevent obstructions from coming between the transmission apparatus 2 and the mobile object 10. Accordingly, it is possible to prevent the delay amount between the change of the RSS and the change of the observation position from becoming unstable due to obstructions, and therefore it is possible to set a time window with a suitable time span.

The start point of the time window is set to be a predetermined time before the observation timing of each piece of observation data. Accordingly, if the RSS change is temporally delayed with respect to the change of the observation position, it is possible to reliably reduce this delay.

The end point of the time window is set to be the observation timing. Accordingly, it is possible for the position correcting section 13 to correct the position for each observation timing.

(3-1-1. Detailed Example of Time Window Setting)

Figure 5:
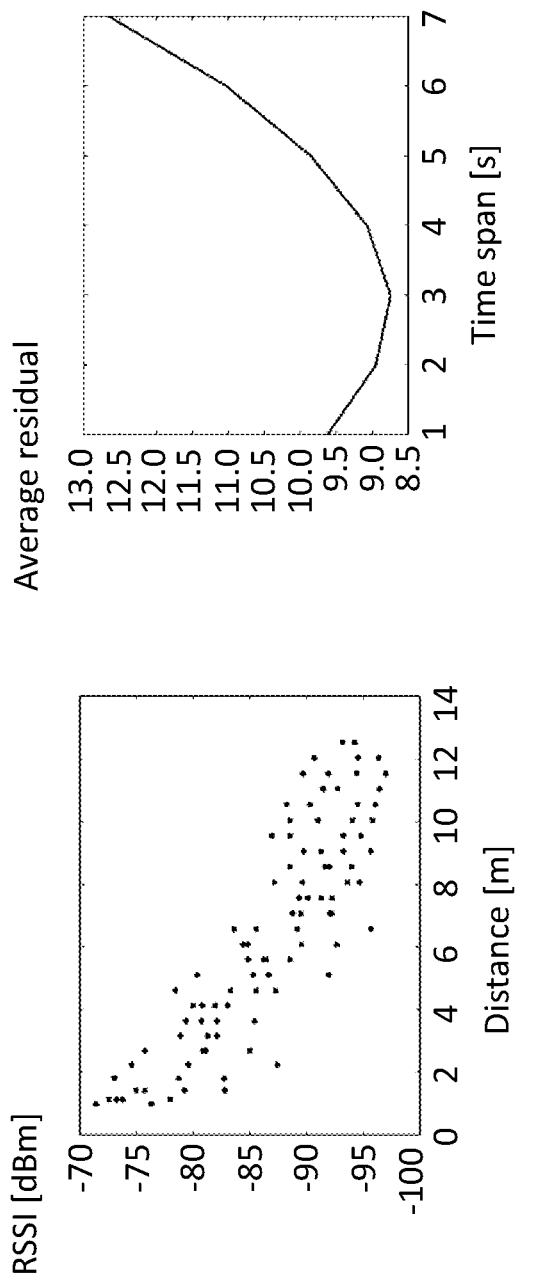
FIG. 5 shows a detailed example of the time window setting, according to an embodiment of the present invention.

FIG. 5 shows a detailed example of the time window setting.

The graph on the left side shows the relationship between the distance from the transmission apparatus 2 to the mobile object 10 and the RSS in the observation data, with the horizontal axis indicating the distance and the vertical axis indicating the RSS. As shown in the drawing, the RSS measurement value becomes smaller as the propagation distance becomes larger.

The graph on the right side shows the relationship between the tentative time span of the tentative time window and the average residual calculated by the residual calculating section 124. The horizontal axis indicates the tentative time span, and the vertical axis indicates the average value of the residual. As shown in the drawing, the residual value is smallest when the time span is 3 seconds. In this case, the time span of the time window may be set to 3 seconds.

(3-2. RSS Distribution Generation)

Figure 6:
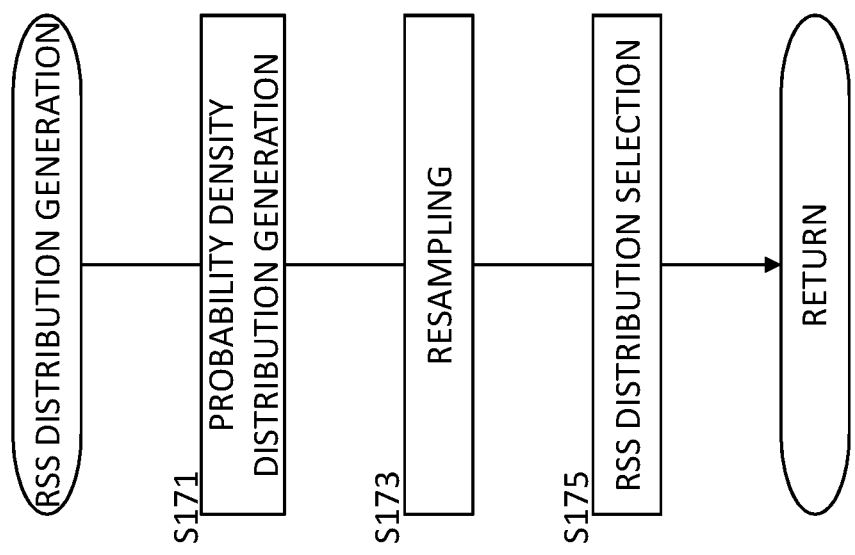
FIG. 6 shows generation of an RSS distribution, according to an embodiment of the present invention.

FIG. 6 shows the generation of the RSS distribution in step S17. The RSS distribution generating section 14 generates the RSS distribution by performing the process of steps S171 to S175.

First, at step S171, the probability density distribution generating section 141 generates the probability density distribution indicating the distribution of the plurality of observation positions. For example, the probability density distribution generating section 141 may generate the probability density distribution through kernel density estimation. As one example, the probability density distribution generating section 141 may generate the probability density distribution at each observation position, by adding together the probability density distribution resulting from the kernel function centered on this observation position. In this way, the probability density of each observation position becomes higher in the region where the observation positions are gathered more densely.

Next, at step S173, the resampling section 142 extracts each piece of observation data corresponding to some of the positions among the plurality of positions from the plurality of pieces of observation data, according to a plurality of extraction ratios. For example, the resampling section 142 may perform resampling on each of the plurality of observation positions included in the observation data with a plurality of extraction ratios, according to a probability that has an inverse correlation with the probability resulting from the probability density distribution from the probability density distribution generating section 141, e.g. a probability that is inversely proportional to the probability resulting from the probability density distribution. The resampling section 142 may extract each piece of observation data including each resampled observation position, from the plurality of pieces of observation data. In this way, the pieces of observation data including observation positions with high probability densities, i.e. the observation positions in a densely packed region, are less like to be resampled, and the RSS distribution is generated with an observation position density that has been made more uniform.

As one example, the resampling section 142 may set a weighting coefficient that is inversely proportional to the probability density, for each observation position. Furthermore, the resampling section 142 may extract the observation positions using an importance sampling technique, e.g. systematic resampling. The resampling section 142 may perform the extraction several times while sequentially changing the number of observation positions extracted. The number of extractions may be a value expressed by the integer portion of the product of the extraction ratio and the number of observation positions, for example. The extraction ratio may be sequentially changed, and the number of extractions may be updated according to this change.

Next, at step S175, the RSS distribution selecting section 143 selects the RSS distribution whose index value indicating non-uniformity is smallest, from among the plurality of RSS distributions obtained using different extraction ratios. For example, the RSS distribution selecting section 143 may calculate the index value indicating the non-uniformity for each RSS distribution obtained using a different extraction ratio, and select the RSS ratio with the lowest non-uniformity. The index value may be the discrepancy, and may be the star-discrepancy, for example. Such an index value is calculated using a conventional and widely known technique.

With the RSS distribution generation described above, each of the plurality of observation positions is resampled with a probability having an inversely correlated relationship with the probability resulting from the probability density distribution, and therefore the resampling is performed with the observation positions with high probability densities having been thinned. Accordingly, it is possible to generate the RSS distribution in which the observation position distribution has been made more uniform.

(3-2-1. Detailed Example of RSS Distribution Generation)

Figure 7:
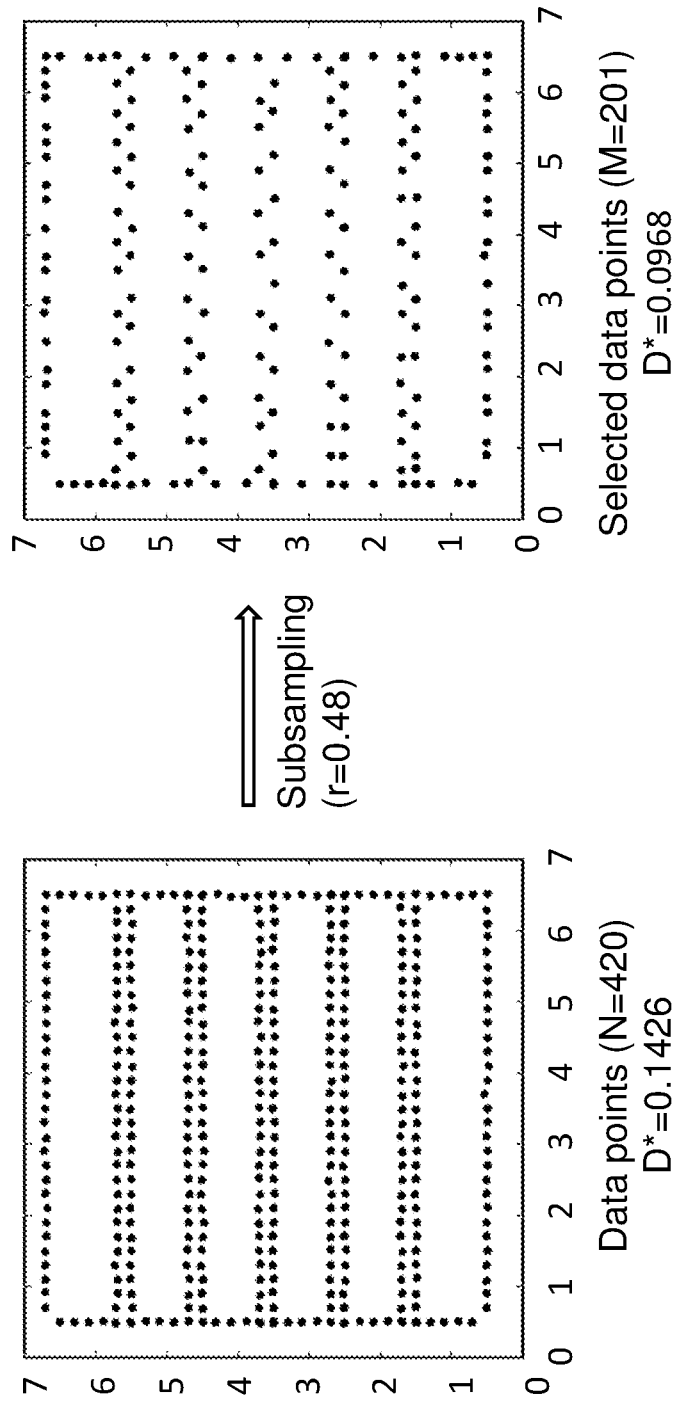
FIG. 7 shows a detailed example of the RSS distribution generation, according to an embodiment of the present invention.

FIG. 7 shows a detailed example of RSS distribution generation. The plotted points in the drawing indicate RSS observation positions. The rectangular frame indicates the floor of a building, and the vertical and horizontal scales indicate the coordinates on the floor. Furthermore, the left side of the drawing indicates the RSS distribution acquired according to the process of step S13, and the right side of the drawing indicates the RSS distribution generated according to the process of step S17. As shown in the drawing, by performing resampling with an extraction ratio of 0.48 in the process of step S17 to reduce the number of observation positions from 420 to 201, the star-discrepancy is reduced from 0.1426 to 0.0968 and the observation position distribution becomes more uniform.

(4. Modifications)

In the embodiments described above, the apparatus 1 is described as including the time window setting section 12, the position correcting section 13, and the RSS distribution generating section 14, but the apparatus 1 does not need to include all of these sections. For example, if the apparatus 1 does not include the time window setting section 12, the position correcting section 13 may use a time window having a predetermined time span, instead of the time window set by the time window setting section 12. The predetermined time span may be different for each piece of observation data, or may be the same value. As an example, the predetermined time span may be set for each piece of observation data such that all past observation timings are included in the time span. The apparatus 1 may instead correct each position of the mobile object 10 included in each piece of observation data without using the time window, as long as the apparatus 1 corrects each position of the mobile object 10 included in each piece of observation data using at least one position of the mobile object 10 at time before the RSS included in the piece of observation data is observed. In these cases, the position correcting section 13 may correct the observation positions included respectively in the plurality of pieces of observation data to be the exponential moving average of all past observation positions. In case that the apparatus 1 does not use the time window, the position correcting section 13 may correct the observation position included in each piece of observation data to be the observation position included in another piece of observation data observed at least one timing earlier than the piece of observation data. If the apparatus 1 does not include the time window setting section 12 or the position correcting section 13, the RSS distribution generating section 14 may acquire the observation data from the acquiring section 11 instead of from the position correcting section 13. If the apparatus 1 does not include the position correcting section 13, the acquiring section 11 may acquire the observation data occurring when the mobile object 10 stops at each observation position. If the apparatus 1 does not include the RSS distribution generating section 14, the model generating section 15 may generate the positioning model from the observation data that has been position-corrected by the position correcting section 13.

Figure 8:
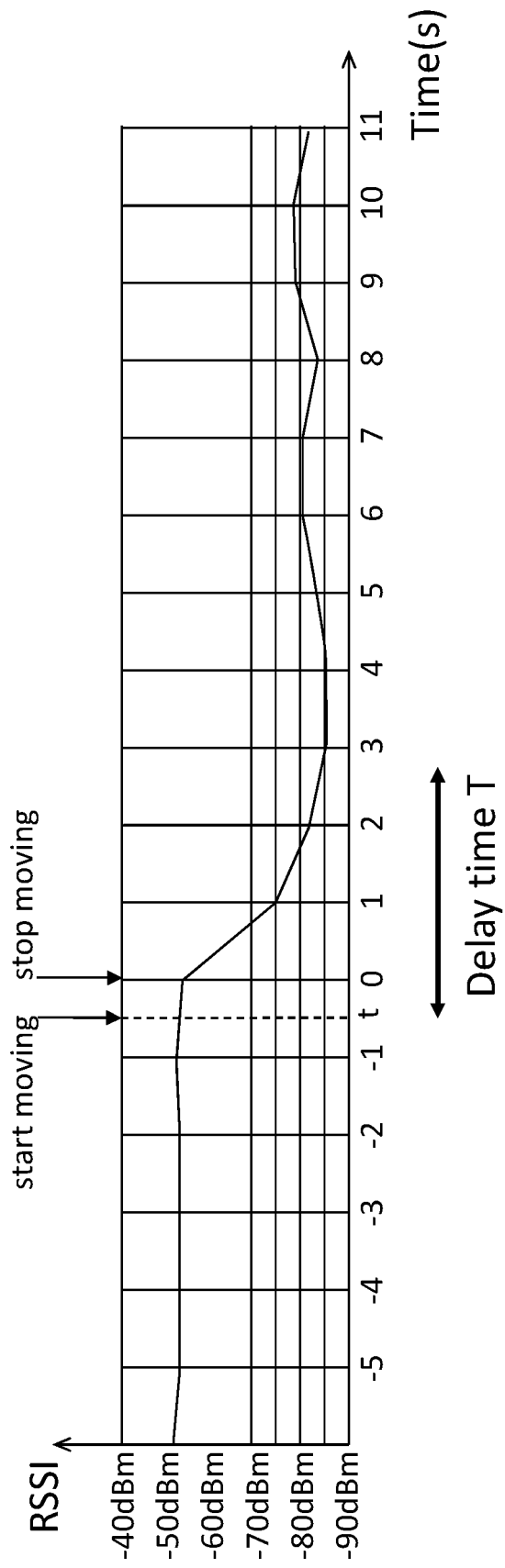
FIG. 8 shows a delay amount of a change of the RSS with respect to a change of the position of the mobile object, according to an embodiment of the present invention.

Furthermore, in the above description, the time window setting section 12 sets the tentative time span occurring when the residual between the RSS prediction value and the measurement value is at a minimum to be the time span of the time window. However, the time window setting section 12 may set another type of time span, as long as the time span is set based on the delay amount of the RSS change that accompanies the movement of the mobile object 10 relative to the transmission apparatus 2. FIG. 8 shows the delay amount of the RSS change relative to the change of the observation position. In the drawing, the vertical axis is the RSS in the observation data, and the horizontal axis is time. This drawing shows that, if the mobile object 10 moves away from the transmission apparatus 2 during the time period from the timing t to the timing 0, the RSS decreases after a delay time T has passed. In such a case, the time window setting section 12 may set the time span of the time window such that a timing that is earlier than the observation timing by the delay time T is included in the time span, and may set the delay time T as the time span of the time window, for example.

Furthermore, in the above description, the RSS distribution generating section 14 generates the probability density distribution of the plurality of observation positions and extracts each piece of observation data corresponding to some of the positions according to a plurality of extraction ratios, to selects the RSS distribution whose index value indicating non-uniformity is smallest. However, the RSS distribution generating section 14 may generate the RSS distribution differently. For example, the RSS distribution generating section 14 may select plurality of observation positions such that the index value is smallest, by using combinatorial optimization.

Furthermore, in the above description, the apparatus 1 includes the mobile object 10. However, the apparatus 1 does not need to include the mobile object 10. In this case, the apparatus 1 may include a requesting section which sends a request to move the mobile object 10. The request may be sent to the moving section 100 in the mobile object 10. The request may instead be sent to a display of the apparatus 1 in order to cause the operator to move the mobile object 10.

Figure 9:
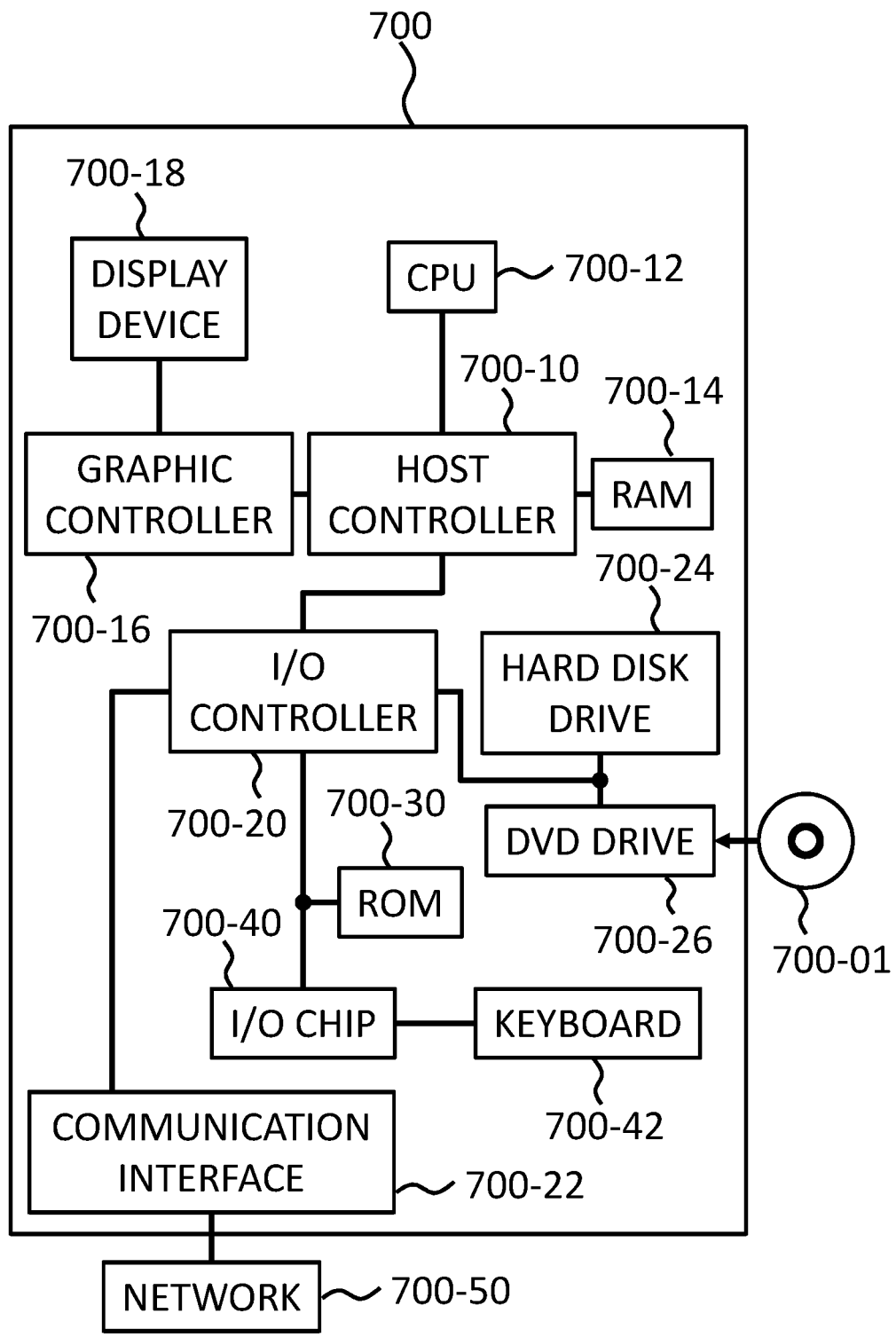
FIG. 9 shows an exemplary hardware configuration of a computer according to an embodiment of the present invention.

FIG. 9 shows an exemplary hardware configuration of a computer configured to perform the foregoing operations, according to an embodiment of the present invention. A program that is installed in the computer 700 can cause the computer 700 to function as or perform operations associated with apparatuses of the embodiments of the present invention or one or more sections (including modules, components, elements, etc.) thereof, and/or cause the computer 700 to perform processes of the embodiments of the present invention or steps thereof. Such a program may be executed by the CPU 700-12 to cause the computer 700 to perform certain operations associated with some or all of the blocks of flowcharts and block diagrams described herein.

The computer 700 according to the present embodiment includes a CPU 700-12, a RAM 700-14, a graphics controller 700-16, and a display device 700-18, which are mutually connected by a host controller 700-10. The computer 700 also includes input/output units such as a communication interface 700-22, a hard disk drive 700-24, a DVD-ROM drive 700-26 and an IC card drive, which are connected to the host controller 700-10 via an input/output controller 700-20. The computer also includes legacy input/output units such as a ROM 700-30 and a keyboard 700-42, which are connected to the input/output controller 700-20 through an input/output chip 700-40.

The CPU 700-12 operates according to programs stored in the ROM 700-30 and the RAM 700-14, thereby controlling each unit. The graphics controller 700-16 obtains image data generated by the CPU 700-12 on a frame buffer or the like provided in the RAM 700-14 or in itself, and causes the image data to be displayed on the display device 700-18.

The communication interface 700-22 communicates with other electronic devices via a network 700-50. The hard disk drive 700-24 stores programs and data used by the CPU 700-12 within the computer 700. The DVD-ROM drive 700-26 reads the programs or the data from the DVD-ROM 700-01, and provides the hard disk drive 700-24 with the programs or the data via the RAM 700-14. The IC card drive reads programs and data from an IC card, and/or writes programs and data into the IC card.

The ROM 700-30 stores therein a boot program or the like executed by the computer 700 at the time of activation, and/or a program depending on the hardware of the computer 700. The input/output chip 700-40 may also connect various input/output units via a parallel port, a serial port, a keyboard port, a mouse port, and the like to the input/output controller 700-20.

A program is provided by computer readable media such as the DVD-ROM 700-01 or the IC card. The program is read from the computer readable media, installed into the hard disk drive 700-24, RAM 700-14, or ROM 700-30, which are also examples of computer readable media, and executed by the CPU 700-12. The information processing described in these programs is read into the computer 700, resulting in cooperation between a program and the above-mentioned various types of hardware resources. An apparatus or method may be constituted by realizing the operation or processing of information in accordance with the usage of the computer 700-

For example, when communication is performed between the computer 700 and an external device, the CPU 700-12 may execute a communication program loaded onto the RAM 700-14 to instruct communication processing to the communication interface 700-22, based on the processing described in the communication program. The communication interface 700-22, under control of the CPU 700-12, reads transmission data stored on a transmission buffering region provided in a recording medium such as the RAM 700-14, the hard disk drive 700-24, the DVD-ROM 700-01, or the IC card, and transmits the read transmission data to network 700-50 or writes reception data received from network 700-50 to a reception buffering region or the like provided on the recording medium.

In addition, the CPU 700-12 may cause all or a necessary portion of a file or a database to be read into the RAM 700-14, the file or the database having been stored in an external recording medium such as the hard disk drive 700-24, the DVD-ROM drive 700-26 (DVD-ROM 700-01), the IC card, etc., and perform various types of processing on the data on the RAM 700-14. The CPU 700-12 may then write back the processed data to the external recording medium.

Various types of information, such as various types of programs, data, tables, and databases, may be stored in the recording medium to undergo information processing. The CPU 700-12 may perform various types of processing on the data read from the RAM 700-14, which includes various types of operations, processing of information, condition judging, conditional branch, unconditional branch, search/replace of information, etc., as described throughout this disclosure and designated by an instruction sequence of programs, and writes the result back to the RAM 700-14. In addition, the CPU 700-12 may search for information in a file, a database, etc., in the recording medium. For example, when a plurality of entries, each having an attribute value of a first attribute is associated with an attribute value of a second attribute, are stored in the recording medium, the CPU 700-12 may search for an entry matching the condition whose attribute value of the first attribute is designated, from among the plurality of entries, and reads the attribute value of the second attribute stored in the entry, thereby obtaining the attribute value of the second attribute associated with the first attribute satisfying the predetermined condition.

The above-explained program or software modules may be stored in the computer readable media on or near the computer 700. In addition, a recording medium such as a hard disk or a RAM provided in a server system connected to a dedicated communication network or the Internet can be used as the computer readable media, thereby providing the program to the computer 700 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to individualize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

As made clear from the above description, with the embodiments of the present invention, it is possible to increase the accuracy of the positioning model for estimating the RSS from the positions.

What is claimed is:

1. A computer-implemented method comprising:
acquiring a first plurality of pieces of observation data, each piece of observation data including a position of a mobile object and a received signal strength of a wireless signal, wherein the position is supplied by the mobile object and the received signal strength of the wireless signal is observed by the mobile object;
obtaining a time window set based on a delay amount of a change of the received signal strength that accompanies a movement of the mobile object, including setting a time span based on the received signal strength included in each of a second plurality of pieces of observation data;
correcting, for each observation timing of the received signal strength, each respective position of the mobile object included in each piece of observation data of the first plurality of pieces of observation data using at least one position of the mobile object within the time window;
calculating a prediction value of the received signal strength of the wireless signal for each of a second plurality of pieces of observation data, using a distance between a transmission apparatus and the position of the mobile object included in each of the second plurality of pieces of observation data acquired during the process of setting the time window;
correcting the prediction value to obtain a corrected prediction value using the prediction value within the time window; and
setting the time span as a time span for which a residual between the corrected prediction value and the received signal strength of the wireless signal included in each of the second plurality of pieces of observation data is at a minimum.

2. The computer-implemented method according to claim 1, wherein the time span has a start point that is a time earlier than the observation timing.

3. The computer-implemented method according to claim 2, wherein time span has an end point that is the observation timing.

4. The computer-implemented method according to claim 1, wherein the correcting includes calculating the position of the mobile object included in each of the first plurality of pieces of observation data, using the position of the mobile object included in at least one piece of observation data observed at the observation timing within the time window, among the first plurality of pieces of observation data.

5. The computer-implemented method according to claim 4, wherein the correcting includes correcting the position of the mobile object included in each of the first plurality of pieces of observation data to be an average of the positions of the mobile object included in at least one piece of observation data observed at the observation timing within the time window, among the first plurality of pieces of observation data.

6. The computer-implemented method according to claim 1, further comprising: sending a request to move the mobile object relative to the transmission apparatus that transmits the wireless signal, during a process of setting the time window; and setting the time window based on the request.

7. The computer-implemented method according to claim 1, further comprising: generating a received signal strength distribution in which a distribution of positions included in the first plurality of pieces of observation data has been made uniform, by extracting each piece of observation data corresponding to some positions from the first plurality of pieces of observation data for which the position of the mobile object has been corrected.

8. A computer program product for generating a received signal strength distribution, the computer program product comprising a computer readable storage medium having program instructions embodied therewith, the program instructions executable by a device to cause the device to perform operations comprising:
acquiring a first plurality of pieces of observation data, each piece of observation data including a position of a mobile object and a received signal strength of a wireless signal, wherein the position is supplied by the mobile object and the received signal strength of the wireless signal is observed by the mobile object;
obtaining a time window set based on a delay amount of a change of the received signal strength that accompanies a movement of the mobile object, including setting a time span based on the received signal strength included in each of a second plurality of pieces of observation data;
correcting, for each observation timing of the received signal strength, each respective position of the mobile object included in each piece of observation data of the first plurality of pieces of observation data using at least one position of the mobile object within the time window:
calculating a prediction value of the received signal strength of the wireless signal for each of a second plurality of pieces of observation data, using a distance between a transmission apparatus and the position of the mobile object included in each of the second plurality of pieces of observation data acquired during the process of setting the time window;
correcting the prediction value to obtain a corrected prediction value using the prediction value within the time window; and
setting the time span as a time span for which a residual between the corrected prediction value and the received signal strength of the wireless signal included in each of the second plurality of pieces of observation data is at a minimum.

9. The computer program product according to claim 8, wherein the program instructions further cause the device to perform operations comprising: generating a received signal strength distribution in which a distribution of positions included in the first plurality of pieces of observation data has been made uniform, by extracting each piece of observation data corresponding to some positions from the first plurality of pieces of observation data for which the position of the mobile object has been corrected.

10. An apparatus comprising: at least one processor coupled to at least one computer readable storage medium having computer readable program instructions that when executed cause the at least one processor:
to acquire a first plurality of pieces of observation data, each piece of observation data including a position of a mobile object and a received signal strength of a wireless signal, wherein the position is supplied by the mobile object and the received signal strength of the wireless signal is observed by the mobile object;

to obtain a time window set based on a delay amount of a change of the received signal strength that accompanies a movement of the mobile object by setting a time span based on the received signal strength included in each of a second plurality of pieces of observation data;

to correct, for each observation timing of the received signal strength, each respective position of the mobile object included in each piece of observation data of the first plurality of pieces of observation data using at least one position of the mobile object within the time window time;

to calculate a prediction value of the received signal strength of the wireless signal for each of a second plurality of pieces of observation data, using a distance between a transmission apparatus and the position of the mobile object included in each of the second plurality of pieces of observation data acquired during the process of setting the time window;

to correct the prediction value to obtain a corrected prediction value using the prediction value within the time window: and to set the time span as a time span for which a residual between the corrected prediction value and the received signal strength of the wireless signal included in each of the second plurality of pieces of observation data is at a minimum.

11. The apparatus according to claim 10, wherein time span has a start point that is a predetermined time earlier than the observation timing and an end point that is the observation timing.

12. The apparatus according to claim 10, wherein the at least one computer readable storage medium having computer readable program instructions that when executed cause the at least one processor to generate a received signal strength distribution in which a distribution of positions included in the first plurality of pieces of observation data has been made uniform, by extracting each piece of observation data corresponding to some positions from the first plurality of pieces of observation data for which the position of the mobile object has been corrected.

* * * * *